United States Patent Office 3,660,540
Patented May 2, 1972

---

3,660,540
O-LOWER ALKYL-O-(2 - CARBISOPROPOXY-PHENYL) PHOSPHORIC ACID DIESTER AMIDES
Wolfgang Hofer, Wuppertal-Elberfeld, Gerhard Schrader, Wuppertal-Cronenberg, and Ingeborg Hammann, Cologne, Germany, assignors to Farbenfabriken Bayer Aktiengesellschaft, Leverkusen, Germany
No Drawing. Filed May 26, 1970, Ser. No. 40,736
Claims priority, application Germany, June 13, 1969, P 19 30 216.0
Int. Cl. C07f 9/12; A01n 9/36
U.S. Cl. 260—941                                       9 Claims

ABSTRACT OF THE DISCLOSURE

O-lower alkyl-O-(2-carbisopropoxyphenyl) phosphoric acid diester amides wherein the amide group may be mono-substituted with a lower alkyl radical, which possess arthropodicidal, especially acaricidal and insecticidal, properties and new methods for their preparation.

---

The present invention relates to and has for its objects the provision of particular new O-lower alkyl-O-(2-carbisopropoxyphenyl) phosphoric acid diester amides wherein the amide group may be mono-substituted with a lower alkyl radical, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is known that N,N-dimethylamido-O-ethyl- and bis-(N,N-dimethylamido)-phosphorylsalicylic acid ethyl esters as well as O,O-dialkylthionophosphorylsalicylic acid esters exhibit insecticidal properties (see German Patent Specifications 814,152 and 811,514, as well as R.L. Metcalf "Organic Insecticides" Interscience Publishers, New York, 1955).

The present invention provides new O-lower alkyl-O-(2-carbisopropoxyphenyl) phosphoric acid diester amides which may also be identified as amidophosphorylsalicylic acid esters of the formula

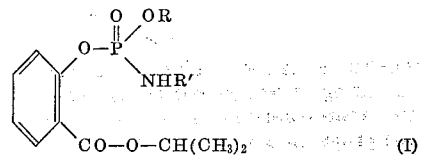

(I)

in which:

R is a straight or branched chain lower alkyl radical, and R' is hydrogen or straight or branched chain lower alkyl radical, which exhibit strong insecticidal and acaricidal properties.

The present invention also provides several process variants for the preparation of the new amidophosphorylsalicylic acid esters of the Formula I, in one of which (a) an amidothionophosphorylsalicylic acid ester of the formula

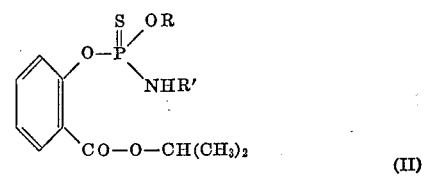

(II)

is oxidized with selenium dioxide, or in another of which (b) an O-alkyl-O-(2-carbalkoxyphenyl)-phosphoric acid diester monohalide of the formula

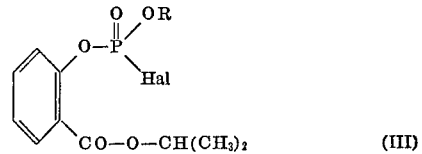

(III)

is reacted with ammonia or a primary amine of the formula

NH₂R' in the presence of an acid-binding agent, or in a third of which (c) an O-alkylphosphoric acid ester amide chloride of the general formula

(V)

is reacted with salicylic acid iso-propyl ester, or an alkali metal or ammonium salt thereof, optionally in the presence of an acid-binding agent.

In the Formulae II to V, R and R' have the meanings stated above the Formula I and Hal stands for a halogen atom.

Surprisingly, the amidophosphorylsalicylic acid esters according to the invention show considerably higher insecticidal and acaricidal activity, especially, excellent activity against biting and sucking insects—than the N,N-dimethylamido-O-ethyl or bis-(N,N-dimethylamido)-phosphorylsalicylic acid ethyl esters or O,O-dialkylthionophosphorylsalicylic acid ethyl esters known in the prior art which are the chemically closest compounds of the same type of activity. The invention therefore represents a valuable contribution to the art.

If O - methyl-O-(2-carbisopropoxyphenyl)-thionophosphoric acid diester amide and selenium dioxide are used as starting materials for the process according to process variant (a), the reaction course can be represented by the following equation:

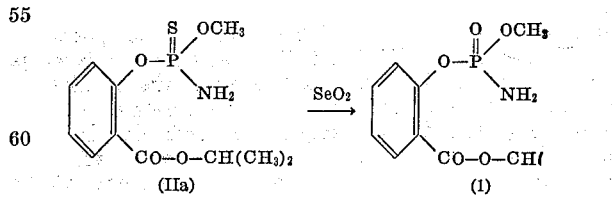

The starting materials to be used for the process are clearly defined by the Formulae II to V. Preferably, R, in the foregoing formulae stands for branched or unbranched alkyl with 1 to 4 and especially 1 to 3 carbon atoms, i.e. methyl, ethyl, n- or iso-propyl; R' preferably stands for alkyl of 1 to 4 carbon atoms, and especially 1 to 3, but most preferably stands for hydrogen. Hal preferably denotes chlorine.

As examples of the amidothionophosphorylsalicylic acid esters of the Formula II which can be used, there are mentioned in particular:

O-methyl-, O-ethyl-, N-methyl-O-methyl-, N-methyl-O-ethyl-, N-ethyl-O-methyl-, N-ethyl-O-ethyl-, N-propyl-O-methyl-, N-iso-propyl-O-methyl-, N-propyl-O-ethyl- and N-iso-propyl-O-ethyl-O-(2-carbisopropoxyphenyl)-thionophosphoric acid diester amides.

As examples of phosphoric acid ester halides or amide halides of Formula III or V, there are mentioned in particular:

O-methyl- and O-ethyl-O-(2-carbisopropoxyphenyl)-phosphoric acid diester chloride, and N-methyl-O-methyl-, N-ethyl-O-ethyl-, N-propyl - O - methyl-, N-propyl-O-ethyl-, N-iso-propyl - O - methyl- and N-iso-propyl-O-ethylphosphoric acid ester amide chloride.

Some of the phosphoric acid derivatives of Formulae I and V required as starting materials for the process according to the invention are known in the literature and all can be prepared according to known processes. The amidothionophosphorylsalicylic acid esters of Formula II can be obtained from O-alkyl-O-(2-carbisopropoxyphenyl)-thionophosphoric acid diester monohalides of the formula

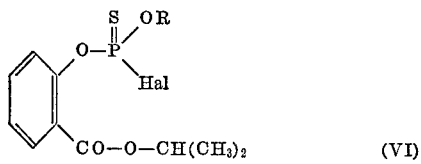

(VI)

with ammonia or primary amines of the Formula IV in organic solvents or in water (as described in Germant patent application P 16 68 047.0).

In Formula VI, R and Hal have the meanings stated above.

As solvents or diluents which may be used in the processes according to the invention, all inert organic solvents or diluents are suitable. These include all aliphatic and aromatic hydrocarbons (which may be chlorinated), such as benzene, toluene, xylene, benzine, methylene chloride, chloroform, carbon tetrachloride and chlorobenzene, ethers, such as diethyl ether, dibutyl ether and dioxane, ketones, such as acetone, methylethyl-, methylisopropyl- and methylisobutyl-ketone, and also, nitriles, such as acetonitrile. The reaction solutions are in most cases stirred for some hours, and are then worked up according to customary methods.

As acid-binding agents all customary acid acceptors are suitable. Particularly suitable are alkali metal carbonates such as sodium and potassium carbonate, alkali metal alcoholates such as sodium or potassium methylate or ethylate, and aliphatic, aromatic or heterocyclic amines, for example triethylamine, dimethylamine, dimethylaniline, dimethylbenzylamine and pyridine.

The reaction temperatures can be carried within a fairly wide range. In general, the work is carried out at from 0° to 100° C., preferably at from 30 to 60° C.

The reactions are, in general, carried out at normal pressure.

When carrying out process variant (a) according to the invention, namely the selenium dioxide oxidation, the selenium dioxide is desirably used in excess of the stoichiometrically equimolar requirements, e.g. a 50 to 150% excess has proved advantageous. In process variants (b) and (c), the starting materials are preferably used in approximately equimolar proportions.

As mentioned briefly above, the new products are distinguished by outstanding effectiveness against plant pests, household pests and pests of stored products, particularly against biting and sucking insects and mites. The pesticidal effect sets in rapidly and is long-lasting.

To the sucking insects contemplated herein there belong, in the main, aphids (Aphidae) such as the green peach aphid (*Myzus persicae*) the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid( *Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Simex lectularius*) the assassin bug (*Rhodnius prolixus*) and Chagas' bug (Triatoma infestans) and, further, cicadas, such as *Euscelis bilobatus* and *Nephotettix bipunctatus*, and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*), and the like.

Also to be classed with the biting insects contemplated herein are beetles (Coleoptera), for example the granary weevil (*Sitophilus granarius=Calandra granaria*), the Colordo beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworm (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*), and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites Tetranychidae) such as the two-spotted spider mite (*Tetranychus telarius=Tetranychus althaeae* or *Tetranychus urticae*) and the European red mite (*Paratetranychus pilosus=Panonychus ulmi*), blister mites, for example the current blister mite (*Eriophyes ribis*) and tarsonemids, for example the board mite (*Hemitarsonemus latus*) and the cyclamen mite (*Tarsonemus pallidus*); finaly, ticks, such as the relapsing fever tick (*Ornithodorus moubata*); and the like.

When applied against household pests and pests of stored products, particularly flies and mosquitoes, the products are distinguished by an outstanding residual effect on wood and clay as well as by a good stability to alkali or limed substrates.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.) ethers, ether-alcohols (e.g. glycol monomethyl ether, etc.) amides (e.g. dimethyl formamide, etc.), sulfoxides (e.g. dimethyl sulfoxide, etc.), ketones (e.g. actone, etc.) and/or water; as well as inert dispersible finely divided solid carriers, such as ground natural minerals (e.g. kaolins, alumina, silica, chalk, i.e. calcium carbonate, talc, kieselguhr, etc.) ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionc and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01 to 5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated wtihout limitation by the following examples:

EXAMPLE 1

Phaedon larvae test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compounds, the times of evaluation and the results can be seen from the following Table 1.

TABLE 1.—PHAEDON LARVAE TEST
[plant-damaging insects]

| Active compounds | | Concentration active compound in percent | Degree of destruction in percent after 3 days |
|---|---|---|---|
| (A) | $(CH_3)_2N\!\!-\!\!\underset{(CH_3)_2N}{\overset{O}{\|}}\!\!P\!\!-\!\!O\!\!-\!\!C_6H_4\!\!-\!\!CO\!\!-\!\!OC_2H_5$ (known) | 0.1 | 0 |
| (B) | $(CH_3)_2N\!\!-\!\!\underset{(C_2H_5)O}{\overset{O}{\|}}\!\!P\!\!-\!\!O\!\!-\!\!C_6H_4\!\!-\!\!CO\!\!-\!\!OC_2H_5$ (known) | 0.1<br>0.01 | 100<br>0 |
| (C) | $(C_2H_5O)_2\overset{S}{\overset{\|}{P}}\!\!-\!\!O\!\!-\!\!C_6H_4\!\!-\!\!CO\!\!-\!\!OC_2H_5$ (known) | 0.1 | 0 |
| (1) | $CH_3O\!\!-\!\!\underset{NH_2}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001<br>0.0001 | 100<br>100<br>100<br>70 |
| (2) | $C_2H_5O\!\!-\!\!\underset{NH_2}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001 | 100<br>100<br>70 |
| (3) | $CH_3O\!\!-\!\!\underset{CH_3-NH}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001 | 100<br>100<br>90 |
| (4) | $C_2H_5O\!\!-\!\!\underset{CH_3-NH}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001 | 100<br>100<br>90 |
| (5) | $C_2H_5O\!\!-\!\!\underset{NH-C_3H_7i}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001 | 100<br>100<br>90 |

The active compounds, the concentrations of the active compounds, the evaluation times and the results can be seen from the following Table 2:

TABLE 2.—PLUTELLA TEST
[plant-damaging insects]

| Active compounds | | Concentration active compound in percent | Degree of destruction in percent after 3 days |
|---|---|---|---|
| (A) | $(CH_3)_2N\!\!-\!\!\underset{(CH_3)_2N}{\overset{O}{\|}}\!\!P\!\!-\!\!O\!\!-\!\!C_6H_4\!\!-\!\!CO\!\!-\!\!OC_2H_5$ (known) | 0.1 | 0 |
| (B) | $(CH_3)_2N\!\!-\!\!\underset{C_2H_5O}{\overset{O}{\|}}\!\!P\!\!-\!\!O\!\!-\!\!C_6H_4\!\!-\!\!CO\!\!-\!\!OC_2H_5$ (known) | 0.1<br>0.01 | 30<br>0 |
| (C) | $(C_2H_5O)_2\overset{S}{\overset{\|}{P}}\!\!-\!\!O\!\!-\!\!C_6H_4\!\!-\!\!CO\!\!-\!\!OC_2H_5$ (known) | 0.1<br>0.01 | 80<br>0 |
| (1) | $CH_3O\!\!-\!\!\underset{NH_2}{\overset{O}{\|}}\!\!P\!\!-\!\!O\!\!-\!\!C_6H_4\!\!-\!\!CO\!\!-\!\!OC_3H_7i$ | 0.1<br>0.01<br>0.001 | 100<br>100<br>80 |
| (2) | $C_2H_5O\!\!-\!\!\underset{NH_2}{\overset{O}{\|}}\!\!P\!\!-\!\!O\!\!-\!\!C_6H_4\!\!-\!\!CO\!\!-\!\!OC_3H_7i$ | 0.1<br>0.01 | 100<br>100 |
| (3) | $CH_3O\!\!-\!\!\underset{CH_3-NH}{\overset{O}{\|}}\!\!P\!\!-\!\!O\!\!-\!\!C_6H_4\!\!-\!\!CO\!\!-\!\!OC_3H_7i$ | 0.1<br>0.01 | 100<br>100 |
| (4) | $C_2H_5O\!\!-\!\!\underset{CH_3-NH}{\overset{O}{\|}}\!\!P\!\!-\!\!O\!\!-\!\!C_6H_4\!\!-\!\!CO\!\!-\!\!OC_3H_7i$ | 0.1<br>0.01 | 100<br>60 |
| (5) | $C_2H_5O\!\!-\!\!\underset{iC_3H_7-NH}{\overset{O}{\|}}\!\!P\!\!-\!\!O\!\!-\!\!C_6H_4\!\!-\!\!CO\!\!-\!\!OC_3H_7i$ | 0.1<br>0.01 | 100<br>100 |

EXAMPLE 2

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (Brassica oleracea) are sprayed with the preparation of the active compound until dew moist and are then infested with caterpillars of the diamond-back moth (Plutella maculipennis).

After the specified periods of time, the degree of destruction is determined as a percentage: 100% means that all the caterpillars are killed whereas 0% means that none of the caterpillars are killed.

EXAMPLE 3

Myzus test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (Brassica oleracea) which have been heavily infested with peach aphids (Myzus persicae) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

TABLE 3.—MYZUS TEST
[Plant-damaging insects]

| Active compounds | Concentrations of active compound in percent | Degree of destruction in percent after 24 hours |
|---|---|---|
| (A) $(CH_3)_2N\!\!-\!\!\overset{O}{\underset{\|}{P}}\!\!-\!\!O\!\!-\!\!C_6H_4\!\!-\!\!CO\!\!-\!\!OC_2H_5$ with $(CH_3)_2N$ (known) | 0.1 | 0 |
| (B) $(CH_3)_2N\!\!-\!\!\overset{O}{\underset{\|}{P}}\!\!-\!\!O\!\!-\!\!C_6H_4\!\!-\!\!CO\!\!-\!\!OC_2H_5$ with $C_2H_5O$ (known) | 0.1 | 0 |
| (C) $(C_2H_5O)_2\overset{S}{\underset{\|}{P}}\!\!-\!\!O\!\!-\!\!C_6H_4\!\!-\!\!CO\!\!-\!\!OC_2H_5$ (known) | 0.1 | 0 |
| (1) $CH_3O\!\!-\!\!\overset{O}{\underset{\|}{P}}(NH_2)\!\!-\!\!O\!\!-\!\!C_6H_4\!\!-\!\!CO\!\!-\!\!OC_3H_7i$ | 0.1 / 0.01 | 100 / 99 |
| (2) $C_2H_5O\!\!-\!\!\overset{O}{\underset{\|}{P}}(NH_2)\!\!-\!\!O\!\!-\!\!C_6H_4\!\!-\!\!CO\!\!-\!\!OC_3H_7i$ | 0.1 | 98 |
| (3) $CH_3O\!\!-\!\!\overset{O}{\underset{\|}{P}}(NHCH_3)\!\!-\!\!O\!\!-\!\!C_6H_4\!\!-\!\!CO\!\!-\!\!OC_3H_7i$ | 0.1 | 98 |
| (4) $C_2H_5O\!\!-\!\!\overset{O}{\underset{\|}{P}}(NHCH_3)\!\!-\!\!O\!\!-\!\!C_6H_4\!\!-\!\!CO\!\!-\!\!OC_3H_7i$ | 0.1 | 98 |
| (5) $C_2H_5O\!\!-\!\!\overset{O}{\underset{\|}{P}}(NHC_3H_7i)\!\!-\!\!O\!\!-\!\!C_6H_4\!\!-\!\!CO\!\!-\!\!OC_3H_7i$ | 0.1 / 0.01 | 98 / 20 |

EXAMPLE 4
Tetranychus test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4:

TABLE 4.—TETRANYCHUS TEST
[plant-damaging mites]

| Active compounds | Concentration of active compound in percent | Degree of destruction in percent after 48 hours |
|---|---|---|
| (A) $(CH_3)_2N\!\!-\!\!\overset{O}{\underset{\|}{P}}\!\!-\!\!O\!\!-\!\!C_6H_4\!\!-\!\!CO\!\!-\!\!OC_2H_5$ with $(CH_3)_2N$ (known) | 0.1 | 0 |
| (B) $(CH_3)_2N\!\!-\!\!\overset{O}{\underset{\|}{P}}\!\!-\!\!O\!\!-\!\!C_6H_4\!\!-\!\!CO\!\!-\!\!OC_2H_5$ with $C_2H_5O$ (known) | 0.1 | 0 |
| (C) $(C_2H_5O)_2\overset{S}{\underset{\|}{P}}\!\!-\!\!O\!\!-\!\!C_6H_4\!\!-\!\!CO\!\!-\!\!OC_2H_5$ (known) | 0.1 | 0 |
| (1) $CH_3O\!\!-\!\!\overset{O}{\underset{\|}{P}}(NH_2)\!\!-\!\!O\!\!-\!\!C_6H_4\!\!-\!\!CO\!\!-\!\!OC_3H_7i$ | 0.1 / 0.01 | 100 / 90 |
| (2) $C_2H_5O\!\!-\!\!\overset{O}{\underset{\|}{P}}(NH_2)\!\!-\!\!O\!\!-\!\!C_6H_4\!\!-\!\!CO\!\!-\!\!OC_3H_7i$ | 0.1 / 0.01 | 90 / 20 |
| (3) $CH_3O\!\!-\!\!\overset{O}{\underset{\|}{P}}(NHCH_3)\!\!-\!\!O\!\!-\!\!C_6H_4\!\!-\!\!CO\!\!-\!\!OC_3H_7i$ | 0.1 | 80 |
| (5) $C_2H_5O\!\!-\!\!\overset{O}{\underset{\|}{P}}(NHC_3H_7i)\!\!-\!\!O\!\!-\!\!C_6H_4\!\!-\!\!CO\!\!-\!\!OC_3H_7i$ | 0.1 | 98 |

The following further examples are set forth to illustrate, without limitation, the process for producing the active compounds according to the present invention.

EXAMPLE 5

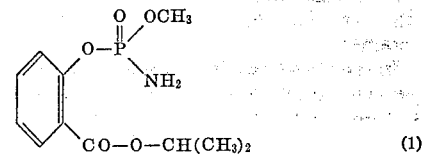

(1)

222 g. (2 moles) of finely powdered selenium dioxide are added in increments to 290 g. (1 mole) of O-methyl-O - (2 - carbisopropoxyphenyl)-thionophosphoric acid diester amide in 500 cc. of methylene chloride, the reaction temperature rising to 30° to 40° C. Stirring is continued for one hour at 40° C., suction filtration of the solids is effected and the solvent is drawn off in a vacuum. The crystalline residue is recrystallized from a benzene-ligroin mixture. 151 g. (55% of the theory) of O-methyl-O - (2 - carbisopropoxyphenyl) - phosphoric acid diester amide of melting point 78° C. are obtained.

The O-methyl-O-(2-carbisopropoxyphenyl)-thionophosphoric acid diester amide used in the above example as the starting material is obtained from O-methyl-O-(2-carbisopropoxyphenyl) - thionophosphoric acid diester monochloride and 15%-strength ammonia solution. The reaction temperature rises to 60° C. After subsidence of the exothermic reaction, the mixture is stirred for a further 24 hours at room temperature. The reaction mixture is then taken up in 200 cc. of benzene and the benzene solution is washed with water until it gives a neutral reaction, dried over sodium sulphate, and the solvent is removed under reduced pressure. The O-methyl-O-(2-carbisopropoxyphenyl) - thionophosphoric acid diester amide so obtained has a melting point of 44° C. Yield: 60% of the theory.

EXAMPLE 6

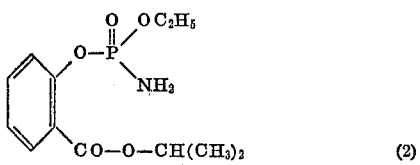

44 g. (0.4 mole) of finely powdered selenium dioxide are added in increments to 60.6 g. (0.2 mole) of O-ethyl-O-(2-carbisopropoxyphenyl)-thionophosphoric acid diester amide in 200 cc. of methylene chloride, the reaction temperature rising to 30 to 40° C. Stirring is continued for 2 hours at 40° C., filtration from the solids is effected and the solvent is drawn off in a vacuum. The crystalline residue is recrystallized from a benzene-ligroin mixture. 36 g. (63% of the theory) of O-ethyl-O-(2-carbisopropoxyphenyl)-phosphoric acid diester amide of melting point 71° C. are obtained.

The O-ethyl-O-(2-carbisopropoxyphenyl)-thionophosphoric acid diester amide used in Example 6 as starting material is prepared in a manner analogous to that stated above for the starting material of Example 5. The yield is 76% of the theory; the melting point is 57° C.

In manner analogous to Examples 5 and 6, the following compounds are prepared:

EXAMPLE 7

N - isopropyl - O - ethyl - O-(2 - carbisopropoxyphenyl)-phosphoric acid diester amide

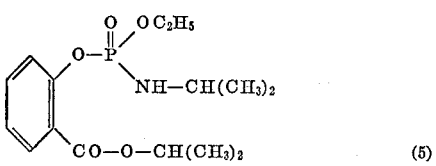

Yield: 71% of the theory; refractive index: $n_D^{23}=1.4850$ prepared from its thiono analogue

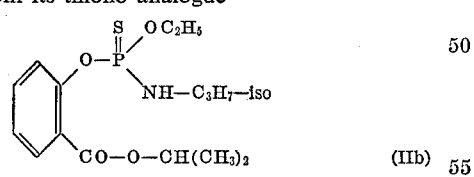

EXAMPLE 8

N - methyl - O - ethyl - O - (2 - carbisopropoxyphenyl)-phosphoric acid diester amide

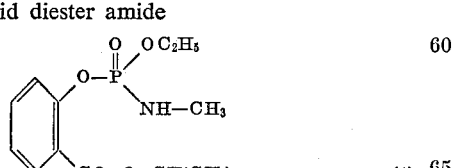

Yield: 63% of the theory; refractive index: $n_D^{23}=1.5035$ prepared from its thiono analogue

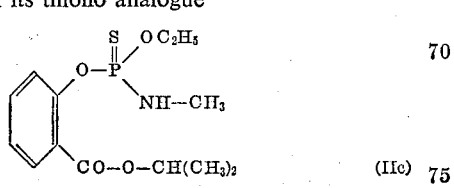

refractive index: $n_D^{24}=1.5258$ which was prepared analogously to the starting compounds of Examples 5 and 6 in 74% yield.

EXAMPLE 9

N - methyl - O - methyl - O - (2 - carbisopropoxyphenyl)-phosphoric acid diester amide

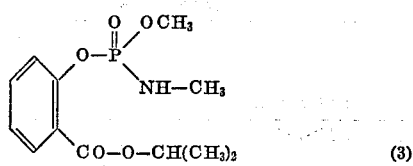

Yield: 50% of the theory; refractive index: $n_D^{23}=1.5070$ prepared from its thiono analogue

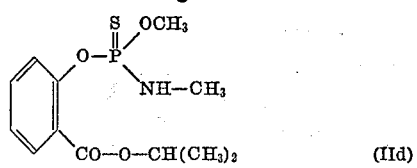

refractive index $n_D^{24}=1.5254$ which was prepared analogously to the starting compounds of Examples 5 and 6 in 46% yield.

EXAMPLE 10

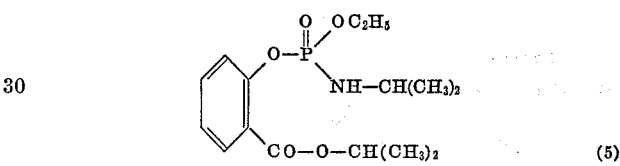

To a suspension of 48 g. (0.3 mole) of potassium carbonate in 150 cc. acetonitrile there are added dropwise, at 30 to 40° C., 54 g. (0.3 mole) of salicylic acid isopropyl ester. 55.6 g. (0.3 mole) of O-ethyl-N-isopropyl-phosphoric acid ester amide chloride are then added slowly to this mixture at 30 to 50° C. Stirring is continued for one hour at 70° C., the solid matter is filtered off with suction, and the solvent is drawn off in a vacuum. The reaction mixture is taken up in 100 cc. of methylene chloride and extracted with 100 cc. of water. After separation and drying of the organic phase, the solvent is drawn off in a vacuum. N-isopropyl-O-ethyl-O-(2-carbisopropoxyphenyl)phosphoric acid diester amide is obtained as yellow oil of refractive index $n_D^{22}=1.4856$. The yield is 86 g. (87% of the theory).

The compounds prepared by the process of Examples 8 and 9 can also be prepared by processes analogous to Example 10 with the following results:

EXAMPLE 11

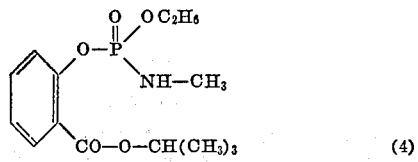

Yield: 81% of the theory; refractive index: $n_D^{22}=1.5036$.

EXAMPLE 12

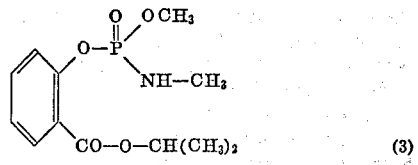

Yield: 52% of the theory; refractive index: $n_D^{22}=1.5101$.

As may be used herein, the terms "arthropod," "arthropodicidal" and "arthropodicide" contemplate specifically both insects and acarids. Thus, the insects and acarids may be considered herein collectively as arthropods to be combatted in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. O-lower alkyl - O - (2-carbisopropoxyphenyl) phosphoric acid diesteramides wherein the amide group may be mono-substituted with a lower alkyl radical.

2. Amidophosphorylsalicylic acid esters of the formula

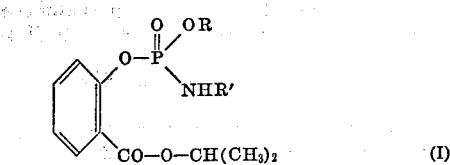
(I)

in which
R is a straight or branched chain lower alkyl radical, and
R' is hydrogen or a straight or branched chain lower alkyl radical.

3. Esters according to claim 2 in which R is an alkyl radical with 1 to 4 carbon atoms and R' is hydrogen or an alkyl radical with 1 to 4 carbon atoms.

4. Esters according to claim 2 in which R is an alkyl radical with 1 to 3 carbon atoms, and R' is hydrogen.

5. Compound according to claim 2 wherein such compound is O-methyl - O - (2-carbisopropoxyphenyl)-phosphoric acid diester amide of the formula

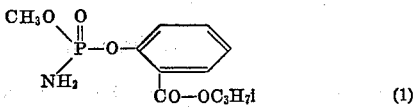
(1)

6. Compound according to claim 2 wherein such compound is O-ethyl-O-(2-carbisopropoxyphenyl)-phosphoric acid diester amide of the formula

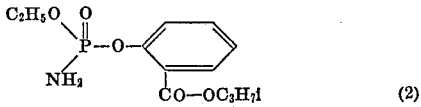
(2)

7. Compound according to claim 2 wherein such compound is N-methyl - O - methyl-O-(2-carbisopropoxyphenyl)phosphoric acid diester amide of the formula

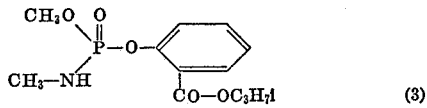
(3)

8. Compound according to claim 2 wherein such compound is N-methyl-O-ethyl-O-(2-carbisopropoxyphenyl)-phosphoric acid diester amide of the formula

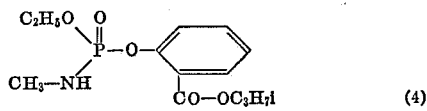
(4)

9. Compound according to claim 2 wherein such compound is N-isopropyl-O-ethyl-O-(2-carbisopropoxyphenyl)-phosphoric acid diester amide of the formula

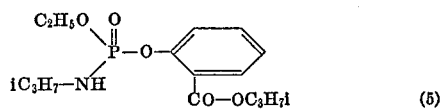
(5)

References Cited
FOREIGN PATENTS

| | | | |
|---|---|---|---|
| 811,514 | 8/1951 | Germany | 260—941 |
| 814,152 | 9/1951 | Germany | 260—941 |

JOSEPH REBOLD, Primary Examiner

A. H. SUTTO, Assistant Examiner

U.S. Cl. X.R.
260—985; 424—220

UNITED STATES PATENT OFFICE
CERTIFICATE OF CORRECTION

Patent No. 3,660,540          Dated May 2, 1972

Inventor(s) Wolfgang Hofer et al

It is certified that error appears in the above-identified patent and that said Letters Patent are hereby corrected as shown below:

Col. 2, line 60

Diagram 1

"CO-O-CH" should read "CO-O-CH$(CH_3)_2$"

Col. 4, line 20

"Simex" should be "Cimex"

Col. 5, line 2

Opening parenthesis should be inserted before "Tetranychidae'

Col. 9, Table 3, Ex. B

Under the "Degree of destruction in % after 24 hours", column, there should be a "0"

Col. 12, line 53, Ex. 11

"$OC_2H_6$" should be "$OC_2H_5$"

Signed and sealed this 28th day of November 1972.

(SEAL)
Attest:

EDWARD M. FLETCHER, JR.
Attesting Officer

ROBERT GOTTSCHALK
Commissioner of Patents